United States Patent [19]

Mori

[11] Patent Number: 5,007,244
[45] Date of Patent: Apr. 16, 1991

[54] DISASTER PREVENTION SYSTEM AND CONSTRUCTION FOR AN UNDERGROUND SPACE

[76] Inventor: Kei Mori, 3-16-3-501, Kaminoge, Setagaya-ku, Tokyo, Japan

[21] Appl. No.: 419,936

[22] Filed: Oct. 11, 1989

[30] Foreign Application Priority Data

Dec. 21, 1988 [JP] Japan .................................. 63-322760
Feb. 21, 1989 [JP] Japan .................................... 1-40886

[51] Int. Cl.⁵ .............................................. F17C 1/00
[52] U.S. Cl. .................................. 62/53.1; 52/169.6; 109/1 S; 62/260; 165/45
[58] Field of Search ................. 62/260, 53.1; 165/45; 60/398, 727; 52/169.6; 109/1 S, 1 V

[56] References Cited

U.S. PATENT DOCUMENTS

| | | | |
|---|---|---|---|
| 3,173,387 | 3/1965 | Cree, Jr. ............... | 109/1 S |
| 3,181,554 | 5/1965 | Cook et al. .......... | 109/1 S |
| 3,191,517 | 6/1965 | Solzman ............... | 109/1 S |
| 3,227,061 | 1/1966 | Swayze ................ | 52/169.6 |
| 3,316,414 | 4/1967 | Bower .................. | 109/1 S |
| 3,866,058 | 2/1975 | Lenssen ............... | 60/727 |
| 3,988,897 | 11/1976 | Strub ................... | 60/398 |
| 4,567,939 | 2/1986 | Dumbeck ............ | 52/169.6 |
| 4,686,822 | 8/1987 | Frutschi ............... | 60/727 |
| 4,777,793 | 10/1988 | Wiegand et al. .... | 60/727 |
| 4,864,812 | 9/1989 | Rodgers et al. .... | 60/727 |

Primary Examiner—Ronald C. Capossela
Attorney, Agent, or Firm—Jordan and Hamburg

[57] ABSTRACT

A disaster prevention system for underground spaces has a compressed air supply system and an independent power generator installed in an underground space. In the event of a disaster, the compressed air supply system discharges compressed air into an underground space in order to maintain the air pressure therein at a higher level than that of the external atmosphere. The independent power generator generates electrical energy which provides the necessary lighting for the underground space.

4 Claims, 3 Drawing Sheets

DISASTER PREVENTION SYSTEM AND CONSTRUCTION FOR AN UNDERGROUND SPACE

BACKGROUND OF THE INVENTION

The present invention relates to an underground disaster prevention system and construction which can provide a temporary underground place of refuge in the event of an earthquake disaster or the like by effectively utilizing underground structures such as basements of multi-story buildings and the like, and, which can effectively prevent the entrance of spring water into the underground space.

The occurrence of a very destructive earthquake in the Tokai district of Japan in the near future has been forecast by seismic experts with a high probability. However, countermeasures against such a possible disaster have not been sufficiently planned. On the other hand, in view of the steep rise in land values, the utilization of deeper underground spaces for the construction of many kinds of facilities including shelters has been recently discussed. However, existing spaces in multi-story buildings, underground shopping areas and subway stations have been built quite deeply into the earth. Since the above-mentioned underground structures in comparison with ground-level facilities are soundly built against earthquake disasters, many lives could be saved if said underground spaces were effectively utilized. However, in the past many lives were lost in underground spaces mainly because of suffocation due to fire, smoke and poisoned air containing carbon monoxide etc. Also if the lights went out there would be the possibility of a serious panic occurring.

Furthermore, in the event of an earthquake or the like there is a high possibility of the occurrence of spring water but it is impossible to estimate where and to what extent the spring water will appear. Consequently, a safe place of refuge cannot be used if spring water enters into the basement or into the underground spaces.

SUMMARY OF THE INVENTION

It is an object of the present invention to provide an underground disaster prevention system and construction which can provide a temporary underground place of refuge at the time of an earthquake or the like by effectively utilizing underground spaces in structures such as basements of multistory buildings, underground shopping areas, subway stations etc.

It is another object of the present invention to provide an underground disaster prevention system and construction which is capable of supplying compressed air, of a higher pressure than the one at ground-level, into an underground space in order to prevent the inflow of flames, smoke and poisonous gases and also to provide underground illumination by effectively driving a independent electric power generator which generates necessary electric energy for keeping the illumination.

It is another object of the present invention to provide a disaster prevention system and construction for protecting people against the entrance of spring water that may occur in the event of a disaster.

DESCRIPTION OF THE PREFERRED EMBODIMENTS

Figure 1:
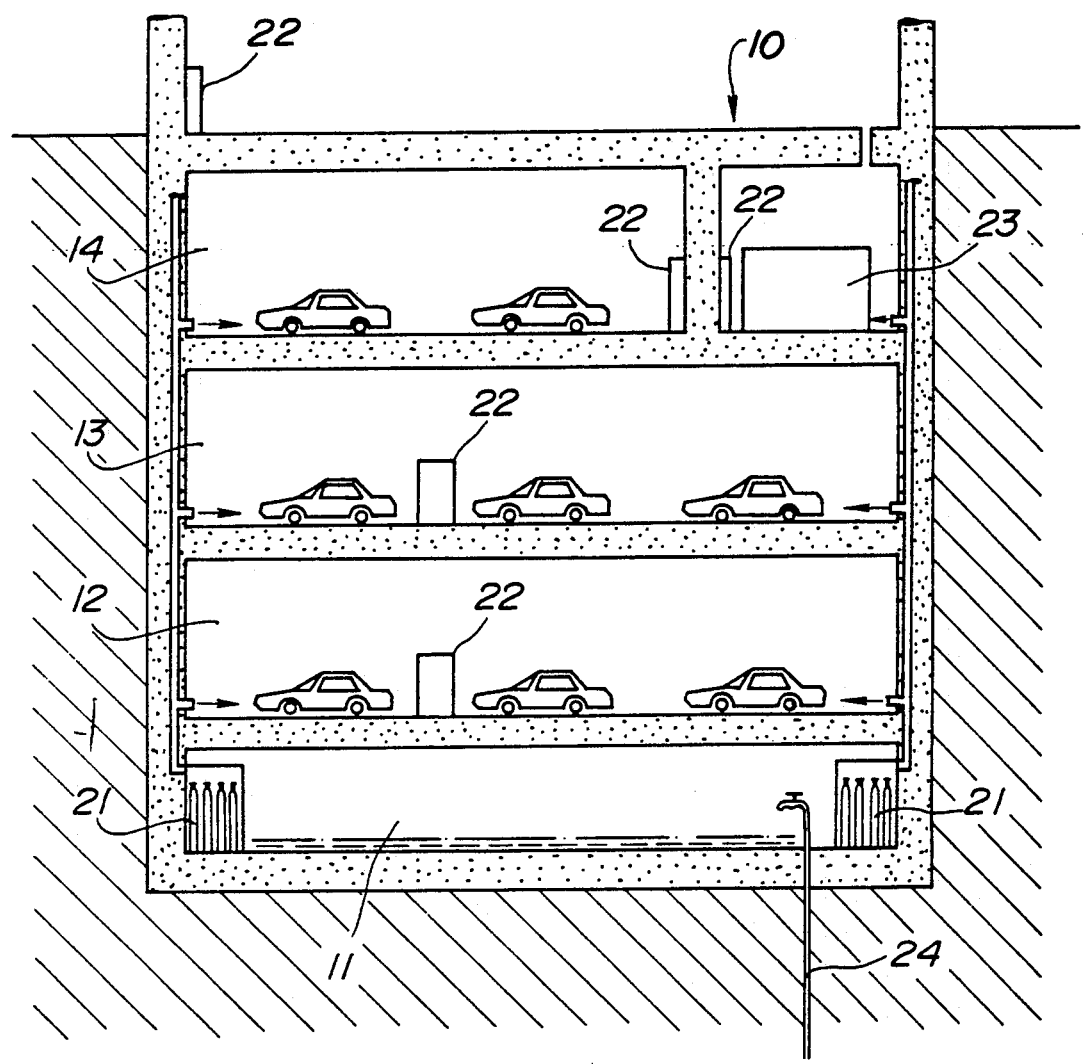
FIGS. 1 and 2 are a construction view for explaining an underground space embodying the present invention.

FIG. 1 is a construction view for explaining an embodiment of the present invention. While an example of the invention is shown as applied to the underground space of a tall building. It will be understood that the invention is not limited to the embodiment shown and hereinafter it will be made clear that it can be applied to all kinds of underground spaces i.e. subway stations, underground shopping areas etc.

In FIG. 1, 10 is an underground space, 11 is a "spring water" bath provided at the lowest level, 12, 13 and 14 are underground parking garages. This is a typical underground area of a usual multistory building. The "spring water" bath 11 is intended to collect therein underground spring water and it is usually kept almost empty by constantly pumping out the water therefrom. Access to said "spring water" bath is usually prohibited and is allowed only in the case of a special need i.e. the bath is usually kept vacant. Cylinders 21 containing compressed air, (liquid air) are provided in said "spring water" bath area, control boxes 22 are arranged at each parking floor level as well and an independent power generator room 30 is provided possibly on the highest level below the street level. In the event of a major earthquake, utter confusion may arise on the street level due to the collapse of many buildings and the occurrence of fires. On the other hand, underground structures and facilities are quite safe except for the danger of fires which cause smoke and other poisonous gases that may be blown therein from the street level and all the power may fail. At present, if people take refuge in an existing underground space, they may suffer from oxygen deficiency and/or easily panic from fear of the dark.

In view of the above-mentioned circumstances, in the system according to the present invention, the provision is made that when any one pushes an "emergency" button on a control box located on each underground floor, all compressed air cylinders blow out compressed air automatically which flows toward the ground and thereby prevents flames, smoke and other poisonous gases from the street level to enter the underground areas. Thus outwardly directed air flow is effective for seeking a safe exit. When the above-mentioned emergency push button or other emergency button is pushed, the an independent power generator 23 is driven to restore the lighting in the underground spaces and it also supplies electric power for driving the sanitary and waste water treatment system. It is preferable that control boxes be arranged on all basement floors and that a guard be posted on the street level. When an emergency button on any box is pressed, compressed air is supplied automatically and a program is started to switch on the independent electric generator 23. While in the embodiment shown where many control boxes are located, it will be easily understood that a single control box may be used and many independent emergency buttons may be arranged at a plurality of places. In FIG. 1, a single large type generator 23 is used, but it is also possible to provide, instead of the one shown, a number of small type gasoline engine generators which, in the event of a disaster, can operate by gasoline taken from automobiles parked on that level. It serves two purposes: the supplying of fuel and the prevention of fire in the parking area. When a pipe 24 or the like is sunk into the soil of the bath area, spring water comes out therethrough. This pipe is equipped with a cock which is usually turned off. At a time of need the cock is turned on to allow the water to be used. Such problems as the supply of air, light and water and sanitary waste treatment can thus be solved.

Furthermore, according to the present invention, in addition to the air necessary for people to breath, oxygen ($O_2$) necessary for driving and operating the power generator is also obtained from said liquid air. Being supplied with liquid air and light oil stored for 3 days's use, the generator will work to produce electric power and distribute it to urgently needed areas, as for instance, for lighting the underground. From each of the automobiles parked in the underground parking areas a certain amount of fuel may be collected for use in power generation. The automobiles themselves may be used as safe, private living spaces.

By providing illumination, saving lives from possible suffocation and by operating information devices to gather real time data, it becomes possible to communicate with the outside world through a communication satellite with the use of a balloon type receiver-transmitter which may be prepared for such a purpose.

Figure 2:
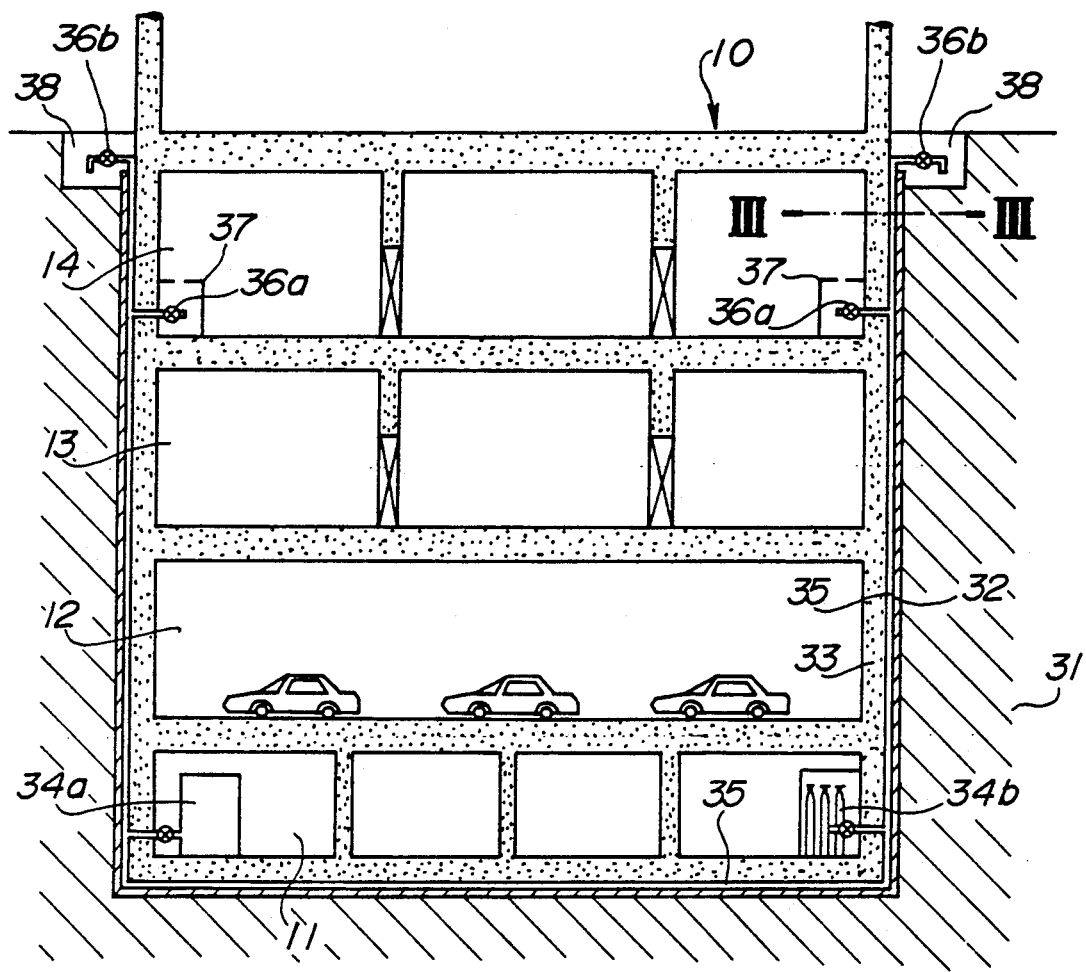
Figure 3:
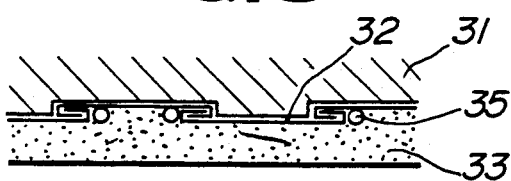
FIG. 3 is a section taken on line III—III of FIG. 2.

FIG. 2 is a construction view for explaining another embodiment of the present invention. FIG. 3 is a sectional view taken on line III—III of FIG. 2. In FIGS. 2 and 3, numeral 31 is soil (earth's crust), 32 is a metal plate with high heat conductivity, 33 is a wall element made of concrete or the like, 34a is a liquid air tank, 34b is a liquid air cylinder, 35 is piping, 36a and 36b are safety valves and 37 and 38 are liquid air discharging tanks. In the embodiment, in the underground space there is located a liquid air tank 34a and a liquid air cylinder 34b from which, in the event of an earthquake disaster, liquid air is discharged to freeze water existing in the soil around said underground space and thereby to form a solid layer of soil capable of blocking the entrance of the spring water into the underground space. This embodiment may be preferably applied to an underground space used as a refuge from a disaster shown in FIG. 1. That is to say, in the event of an earthquake or the like the valves of the liquid air tank 34a and liquid air tank 34b are opened to supply liquid air into the piping 35 and thereby water being contained in the surrounding soil is frozen. In case of a practical construction, as shown in FIG. 3, a number of metal plates 32 of high heat conductivity are arranged in contact with the soil's surface and piping is arranged along the connecting portions of the metal plates. Almost the full amount of water existing in the soil may be blocked by the metal plates 32 but it may enter into the underground space through the connecting portions of the metal plates 32. Consequently, it is efficient to lay out the piping along the joints of the metal plates as shown in FIG. 3. Furthermore, it is preferable to weld each of the pipes 35 onto the metal (steel) plate 32 so that when discharging liquid air into the pipes, water in the soil, along the metal plates' joints, may be quickly frozen to block the water's entrance. Since the cooled liquid air in the pipings 35 can also be quickly transferred to the soil's surface through metal plates 32, water in the soil can be quickly frozen to form an ice barrier (a frozen wall) all over the outer surface of the metal plates joined with each other. This ice barrier is effective enough to block the entrance of spring water or the like into the underground space. The liquid air discharged from the tank or the cylinder into the piping 35 cools down the surroundings through the piping wall and becomes vaporized and therefore the pressure in the piping 35 increases. When the pressure has increased to a specified value, the safety valve 36a is opened to release air from the piping into the discharge tank 37 through which air is supplied into the underground space without directly blowing onto a person's body or onto other objects. While in FIG. 2 there is shown the tank 37 located at the 1st basement floor, it may be placed at any desired level. When air pressure in piping 35 is further increased after the first safety valve 36a is opened, the second safety valve 36b operates at the specified pressure higher than the operating pressure of the first safety valve 36a in order to prevent the inside pressure of the piping 35 from rising above the upper limit of safety. In this case air from the safety valve 36b is also released into the discharge-tank 38 to avoid dangerous direct blowing out of the air. Furthermore, the underground space is equipped with the same facilities as those described in the prior embodiment, for instance, compressed air (liquid air), an independent power generator etc. In addition, an antenna is installed on the building top so as to ensure the possibility of communicating with the other stations. It will be easily understood that the underground space may be used besides as a parking floor shown, as office space, conference rooms or for any other desired purpose.

As is apparent from the foregoing description, according to the present invention, it may be possible to create an inexpensive, safe place of refuge in the case of a disaster, by utilizing an underground space capable of quickly and effectively preventing the entrance of spring water into it which may occur in the event of an earthquake.

Furthermore, the present applicant has previously proposed to focus sunlight or artificial light through lenses or the like, to guide them into a fiber optic cable, and to transmit them therethrough to any desired place where the light rays are used for illumination and for other purposes, as for instance, for increasing the culture of plants or for raising fish. Said solar ray collecting devices have already been put in to practice in cultivating plants and fish in the basements of buildings etc.

Figure 4:
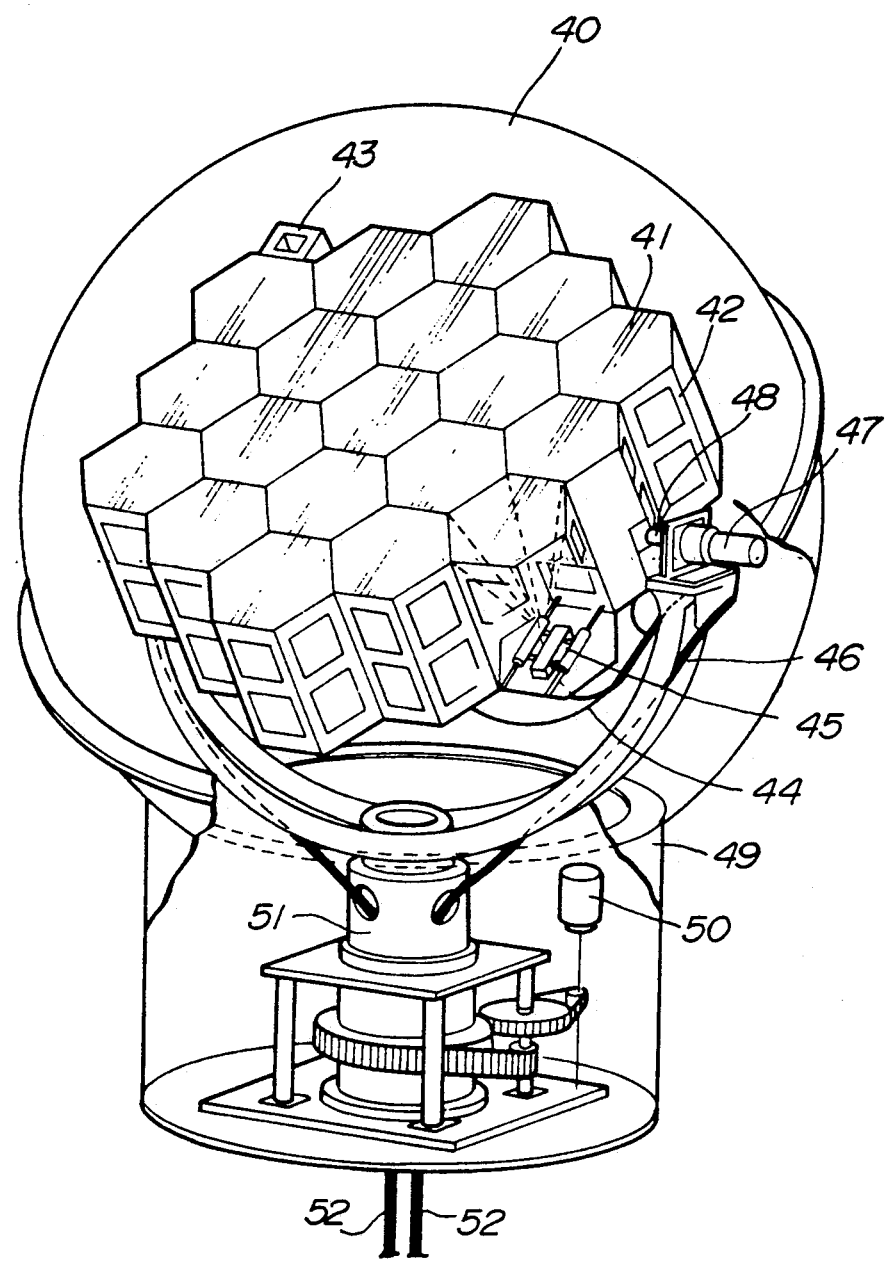
FIG. 4 is a view showing, by way of an example, a solar ray collecting device which has been previously proposed by the present applicant.

FIG. 4 is a view for explaining an embodiment of the afore-mentioned solar ray collecting device which comprises a transparent protective capsule 40, a number of Fresnel lenses 41, a lens system holder 42, a solar position sensor 43, optical fibers or a fiber optic cable 44 consisting of optical fibers (hereinafter called "light guides") having light-receiving ends set at the focal points of the Fresnel lenses, a holder 45 for the optical fibers or the fiber optic cable, an arm 46, a pulse motor 47, a horizontal revolution shaft 48 to be rotated by said pulse motor 47, a base plate 49 for holding the capsule 40, a pulse motor 50 and a vertical revolution shaft 51 to be rotated by the pulse motor 50. The position of the sun is detected by the solar position sensor 42 and its detection signal controls the pulse motor 47 of the horizontal shaft 48 and the pulse motor 50 of the vertical shaft 51 so as to direct the sensor 52 toward the sun, and the sunlight focused through each lens 41 is guided into the light guide through its light-receiving end-surface set at the focal point of the lens. Light guides 44 are bundled into a light guide cable 52 which can be led to any desired place where the light is needed as for instance to a basement wherein plant and fish are being cultivated.

I claim:

1. A disaster prevention system for an underground space comprising liquid air storage means for storing liquid air in said underground space, a power generator means in said underground space, conduit means in said underground space leading from said liquid air storage means to a plurality of locations in said underground space such that liquid air released from said liquid air storage means provides compressed air in said conduit means, said conduit means having a plurality of compressed air outlets located at a plurality of locations in said underground space such that the compressed air in said conduit means is discharged through said outlets to thereby maintain said underground space at pressure higher than atmospheric pressure, said conduit means comprising a conduit means portion leading to said generator means such that the air for operating said generator means is supplied by said liquid air storage means via said conduit means.

2. A disaster prevention system according to claim 1, wherein said liquid air storage means comprises a plurality of liquid air storage cylinders.

3. A disaster prevention system according to claim 1, wherein said underground space has a sub-space, said generator means comprising an internal combustion engine disposed in said sub-space, said conduit means portion comprising a conduit leading to said sub-space for conducting said compressed air to said sub-space for operating said internal combustion engine.

4. A disaster prevention system according to claim 1, wherein said underground space has a lower level forming a sub-space for spring water, said sub-space being the lowermost space of said underground space, said sub-space overlying a section of soil, and a pipe means sunk into said section of soil and leading to said sub-space for conducting spring water from said soil to said sub-space.

* * * * *